Aug. 7, 1951     C. S. ROY     2,563,554
FISHHOOK
Filed Dec. 29, 1945
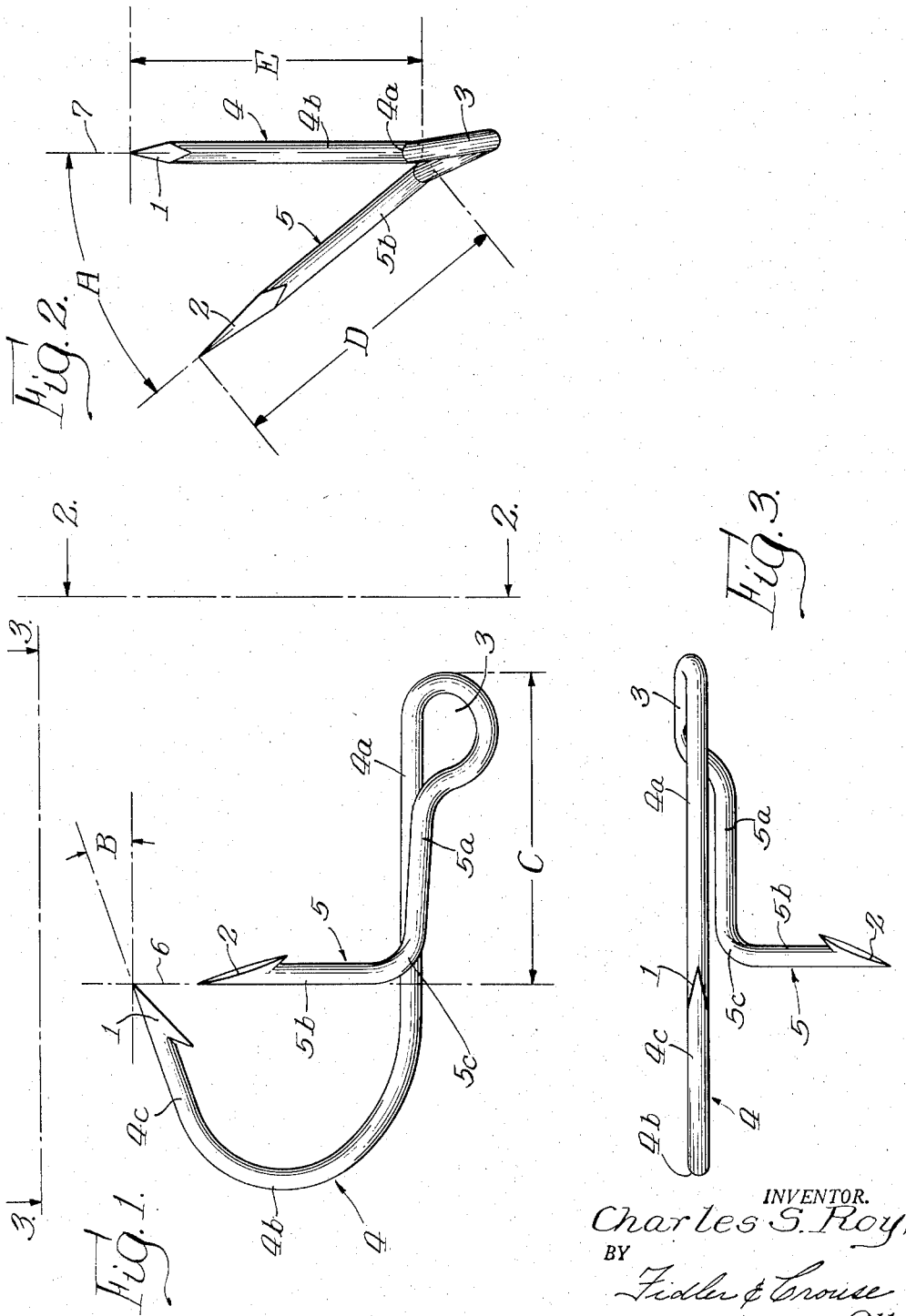
INVENTOR.
Charles S. Roy,
BY
Fidler & Crouse
Atty's.

Patented Aug. 7, 1951

2,563,554

UNITED STATES PATENT OFFICE 2,563,554

FISHHOOK

Charles S. Roy, Mineola, N. Y.

Application December 29, 1945, Serial No. 638,160

2 Claims. (Cl. 43—44.82)

My invention relates to improvements in fish hooks.

One of the principal objects of my invention is to increase the percentage of catch; that is to say, the ratio of fish landed to bait used.

Another object is to provide a fish hook which is not easily swallowed by the fish and which, therefore, can nearly always be readily removed from the fish; and which generally does not fatally injure the fish which must be thrown back because of being under legal size.

Still another object is to provide a fish hook which will enable sport fishermen to land large fish with smaller tackle than otherwise could be done.

Pursuant to the foregoing, additional objects are to save bait, fuel and manpower by increasing the percentage of catch.

My new fish hook has the advantage that no matter how the catch may twist and turn in its effort to free itself, it cannot dislodge the hook; and, what is more, usually cannot swallow the hook. But, notwithstanding the greater certainty with which the fish is secured, it is easier for the fisherman to release the hook, once the catch is landed, than is the case where ordinary fish hooks are employed.

I have found that as a result of using my new hook the percentage of successful catch is increased, proportionately to the bait used, from approximately 45% to approximately 85%, under normal conditions applicable to commercial set-line fishing. This, of course, spells, not only greatly increased economy of bait, but also of time—which means increased profit for the commercial fisherman, and greater satisfaction for the sport fisherman.

My experience indicates that as a result of using my new hook in fishing for troll salmon and other soft-mouth commercial fish the average of strikes landed is increased from a scant 50% to approximately 70%.

In the accompanying drawing I have shown, by way of example, a preferred embodiment of my invention, but it is to be understood that many modifications and variations may be made within the scope and purview of my inventive concept.

In the drawing:

Fig. 1 is a sidewise elevational view of my new fish hook;

Fig. 2 is an endwise elevational view taken along line 2—2 of Fig. 1; and

Fig. 3 is a view taken along line 3—3 of Fig. 1.

Preferably, but not necessarily, my improved fish hook is made from one continuous piece of wire, which is provided with sharp pointed barbs 1 and 2, respectively, at opposite ends. The wire preferably is bent to form an eyelet 3 for attachment to the fishing line. That part of the hook, which is identified as a whole by reference numeral 4, is generally similar but not identical in form to a conventional fish hook and, for convenience of identification, is herein referred to as the main portion. This main portion 4 comprises a shank 4a, which may be straight, a curved portion 4b, a second straight portion 4c and the barb 1.

In addition, my new fish hook comprises what I herein refer to as an auxiliary portion, which is identified as a whole by reference numeral 5. Auxiliary portion 5 includes, in addition to barb 2, a shank 5a and a portion 5b, which latter I herein refer to as a bar, the shank 5a and the portion 5b being interconnected by a curved portion 5c of relatively small radius of curvature. Said bar preferably extends perpendicularly to shank 4a; but in using the term "perpendicularly" in this connection I do not mean to limit myself to an angle of ninety degrees. In practice the bar 5b can extend at an angle somewhat different from ninety degrees with respect to the shank 4a without materially impairing its effectiveness. Therefore, I use the term "perpendicularly" only in an approximate sense. As viewed sidewise of the hook, see Fig. 1, the points of barbs 1 and 2 are preferably both located on a line 6 which is substantially normal to the shank 4a.

As viewed endwise of the hook, see Fig. 2, the bar 5b extends at an angle A with respect to the plane of the main portion, which angle should preferably be between thirty-five degrees and forty-five degrees; and the optimum value lies between thirty-eight degrees and forty-two degrees. What I mean by the "plane of the main portion" is the plane in Fig. 2 which is normal to the surface of the drawing and is identified by line 7. According to my experience the angle A may be as small as thirty degrees, or as large as fifty degrees while still retaining some of the benefits of the invention. The center of the eyelet 3 is offset from both shank portions 4a and 5a and lies in a plane substantially bisecting the angle A.

If angle A falls within the above specified limits, the two portions 4 and 5 will not interfere with each other in hooking the fish and they will so cooperate that the fish cannot disengage itself from either barb. That is to say bar 5b will effectively prevent dislodgment of the fish from barb 1, while that part of the main portion which includes barb 1 is effective to prevent dislodgment of the fish from barb 2. If the angle A is sufficiently large, that is to say, thirty degrees or more, there is a marked tendency to prevent swallowing of the hook. This is because barb 2 will engage the fish's throat and thus prevent the hook from being swallowed. If the angle A is excessively large, there is a tendency for the fish to be caught on barb 1 without being securely caught on barb 2. These various factors appear to account for the fact that angle A is somewhat critical if the best results are to be realized. On the other hand, a great deal depends on the size of the fish as compared to the size of the hook used.

For most satisfactory performance the angle B which the barbed end of the main portion forms with the shank 4a should be between fifteen degrees and twenty-five degrees; and best results have been realized with an angle B of twenty degrees.

It is preferred that the points of the two barbs 1 and 2 be equally distant from the point where the line is attached to eyelet 3.

If the dimension C, Fig. 1, is made too short the fish are apt to sever the line. I have found from experience that best results are achieved when dimension C, Fig. 1, is made equal to dimension D, Fig. 2. However, dimension C may in some instances have to be increased to provide for attachment of certain artificial baits; for example, fishing plugs.

As viewed endwise of the hook, Fig. 2, it is desirable that the radial dimension D to the end of barb 2 be substantially equal to the radial dimension E to the end of barb 1.

While I have pointed out certain minor features, each of which contributes something to the efficacy of my new fish hook, it should be observed that these are not indispensable and may be disregarded without destroying the effectiveness of the invention in its major aspects. My invention should, therefore, not be construed as limited otherwise than in accordance with the terms of the appended claims.

Fish hooks according to my invention can be made in a great variety of sizes and it is to be understood that the scope of my invention is not limited in that respect.

I claim:

1. A fish hook comprising a single length of wire having a barb at each end thereof, said fish hook consisting of a main portion and an auxiliary portion, the wire of said fish hook being bent medially of its ends to form a substantially closed suspension eyelet separating said main portion from said auxiliary portion, said main portion including a straight shank portion extending downwardly from said eyelet portion and adapted to assume a pendant position when the fish hook is freely suspended from said eyelet, a straight bar portion terminating in one of said barbs, and a generally upright U-shaped curved portion of relatively large radius of curvature connecting the lower ends of said shank portion and of said bar portion, said bar portion being inclined outwardly and upwardly with respect to said shank portion and being disposed in a common plane therewith, said auxiliary portion including a straight shank portion extending downwardly from said eyelet portion in substantial parallelism with said other shank portion and in close proximity thereto, to a point medially thereof, a straight bar portion terminating in the other of said barbs, and a curved portion of relatively small radius of curvature connecting said latter shank portion and said latter bar portion, said latter bar and shank portions lying in a common plane and said latter bar portion lying in a plane substantially perpendicular to said shank portions and passing through the barb of said main portion whereby both barbs lie within said last mentioned plane, said barbs being substantially equidistant from the suspension point of said eyelet, the plane of said main shank and bar portion and the plane of said auxiliary shank and bar portion existing at an angle of the order from 38° to 42° relative to each other.

2. A fish hook comprising a single length of wire having a barb at each end thereof, said fish hook consisting of a main portion and an auxiliary portion, the wire of said fish hook being bent medially of its ends to form a substantially closed suspension eyelet separating said main portion from said auxiliary portion, said main portion including a straight shank portion extending downwardly from said eyelet portion and adapted to assume a pendant position when the fish hook is freely suspended from said eyelet, a straight bar portion terminating in one of said barbs, and a generally upright U-shaped curved portion of relatively large radius of curvature connecting the lower ends of said shank portion and of said bar portion, said bar portion being inclined outwardly and upwardly with respect to said shank portion and being disposed in a common plane therewith, said auxiliary portion including a straight shank portion extending downwardly from said eyelet portion in substantial parallelism with said other shank portion and in close proximity thereto, to a point medially thereof, a straight bar portion terminating in the other of said barbs, and a curved portion of relatively small radius of curvature connecting said latter shank portion and said latter bar portion, said latter bar and shank portions lying in a common plane and said latter bar portion lying in a plane substantially perpendicular to said shank portions and passing through the barb of said main portion whereby both barbs lie within said last mentioned plane, said barbs being substantially equidistant from the suspension point of said eyelet, the plane of said main shank and bar portion and the plane of said auxiliary shank and bar portion existing at an angle of the order from 38° to 42° relative to each other, the center of said eyelet portion being offset from both of said shank portions and lying in a plane substantially bisecting the angle existing between said two last mentioned planes.

CHARLES S. ROY.

REFERENCES CITED

The following references are of record in the file of this patent:

UNITED STATES PATENTS

| Number | Name | Date |
|---|---|---|
| 805,284 | Greenway | Nov. 21, 1905 |
| 1,283,718 | Ford | Nov. 5, 1918 |
| 2,047,676 | Edmondson | July 14, 1936 |
| 2,051,651 | Pachner | Aug. 18, 1936 |
| 2,206,321 | Hovey | July 2, 1940 |

FOREIGN PATENTS

| Number | Country | Date |
|---|---|---|
| 81,265 | Switzerland | May 16, 1919 |